(12) United States Patent
Itou et al.

(10) Patent No.: US 10,502,988 B2
(45) Date of Patent: Dec. 10, 2019

(54) OPTICAL MODULATOR MODULE

(71) Applicant: Sumitomo Osaka Cement Co., Ltd, Chiyoda-ku, Tokyo (JP)

(72) Inventors: Takatomo Itou, Chiyoda-ku (JP); Junichiro Ichikawa, Chiyoda-ku (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 16/090,500

(22) PCT Filed: Apr. 3, 2017

(86) PCT No.: PCT/JP2017/013940
§ 371 (c)(1),
(2) Date: Oct. 1, 2018

(87) PCT Pub. No.: WO2017/171096
PCT Pub. Date: Oct. 5, 2017

(65) Prior Publication Data
US 2019/0113779 A1    Apr. 18, 2019

(30) Foreign Application Priority Data

Apr. 1, 2016 (JP) ................................ 2016-073844

(51) Int. Cl.
*G02F 1/035* (2006.01)
*G02F 1/225* (2006.01)

(52) U.S. Cl.
CPC ............ *G02F 1/035* (2013.01); *G02F 1/2255* (2013.01); *G02F 2201/06* (2013.01); *G02F 2201/12* (2013.01); *G02F 2203/21* (2013.01)

(58) Field of Classification Search
CPC .... G02F 1/035; G02F 1/2255; G02F 2201/06; G02F 2201/12; G02F 2203/21
See application file for complete search history.

(56) References Cited

U.S. PATENT DOCUMENTS

| 9,316,887 B2 * | 4/2016 | Sugiyama ............. G02F 1/2255 |
| 2009/0129718 A1 | 5/2009 | Shinriki et al. |

FOREIGN PATENT DOCUMENTS

| JP | S4944189 B1 | 11/1974 |
| JP | S565118 U | 1/1981 |

(Continued)

OTHER PUBLICATIONS

Translation of the International Search Report for PCT/JP2017/013940 dated Jun. 27, 2017.

*Primary Examiner* — John Bedtelyon
(74) *Attorney, Agent, or Firm* — IPhorgan Ltd.

(57) ABSTRACT

Provided is an optical modulator module in which an occurrence of an error burst or an increase of an optical loss caused by a vapor phase transportation material can be effectively suppressed. The optical modulator module includes a substrate 1 that has a pyroelectric effect, an optical waveguide 2 that is formed on a principal surface of the substrate 1, a conductive film (not illustrated) that is formed on the substrate 1, and control electrodes (31 to 33) that control a light wave propagated through the optical waveguide 2. In the optical modulator module, the light wave is input to an end portion 21 of the optical waveguide (or is output from the end portion 21 of the optical waveguide) by a space optical system (not illustrated). Adsorption means 4 for adsorbing a vapor phase transportation material is disposed in the vicinity of the end portion 21 of the optical waveguide.

8 Claims, 1 Drawing Sheet

(56) References Cited

FOREIGN PATENT DOCUMENTS

| JP | S62173428 A | 7/1987 |
| JP | H03202810 A | 9/1991 |
| JP | H03233521 A | 10/1991 |
| JP | 2007101641 A | 4/2007 |
| JP | 2016012037 A | 1/2016 |

* cited by examiner

OPTICAL MODULATOR MODULE

TECHNICAL FIELD

The present invention relates to an optical modulator module, and particularly relates to an optical modulator module including a substrate that has a pyroelectric effect, an optical waveguide that is formed on a principal surface of the substrate, a conductive film that is formed on the substrate, and a control electrode that controls a light wave propagated through the optical waveguide.

BACKGROUND ART

In the industry employing electronic wirings, it is known that a tin whisker grows slowly as time elapses, shortly comes into contact with a terminal on a printed wiring substrate, and causes a short-circuit fault. Up to early 2000s, an occurrence of a tin whisker had been suppressed by adding lead to tin. Recently, due to environmental responses of electronic devices, such as Restriction on Hazardous Substances (RoHS), lead-free raw materials including lead-free solders come into use, and a short circuit caused by a whisker is regarded as a problem again.

In an LN optical modulator in which lithium niobate ($LiNbO_3$) is employed in a waveguide substrate, there is another problem caused by tin contained in a gold tin solder. From a solder in a connection portion between a connector and a housing, a sealing connection portion between an optical fiber and the housing, and the like, tin is transported in the vapor phase to a place between electrodes in the LN optical modulator, is deposited and grows between the electrodes, and causes deterioration of bias stability. In addition to the lead-free tendency, the deterioration of bias stability is also caused due to increased electric wiring portions such as a dual polarization-binary phase shift keying (DP-BPSK) modulator and a dual polarization-quadrature phase shift keying (DP-QPSK) modulator, a narrowed space inside the housing, and the like. Moreover, in DP-QPSK for dual wavelength, in addition to the number of electric wirings, the number of connections with respect to optical fibers is also doubled, and particularly this problem has become noticeable.

In addition, in polarization multiplex-type optical modulator modules such as DP-BPSK modulators and DP-QPSK modulators, when an optical waveguide output port of each modulator and an optical fiber are connected to each other, lens coupling is generally carried out instead of butt joining. In modules having a lens coupling structure, in order to prevent an error burst caused when an optical axis is blocked by particles (hereinafter, optical axis blocking), the modules are assembled in clean environments. In addition, in order to prevent aged deterioration of optical transmission properties (increase of an optical loss) caused by materials such as mist and sol which are transported in the vapor phase and adhere or are scorched on an end surface of an optical waveguide, each component is thoroughly cleaned, and a housing structure, in which the inside of the housing is replaced with dry nitrogen and is sealed, is employed. In this specification, a material in a gaseous state or a material which floats in the space and is transported, such as a particle, mist, and sol, will be generically referred to as a "vapor phase transportation material". Although the expression of "vapor phase transportation material" differs from the original meaning from the technical viewpoint, the term will be defined as described above in this specification.

In addition, recently, the following tendencies (1) to (3) are in progress.
(1) The significantly narrowed internal space of a housing resulted from the downsizing of housing
(2) The increase of materials and members which may become a source of vapor phase transportation materials due to an increase in the number of components resulted from a highly integrated configuration
(3) The increase of light intensity for lengthening a transmission distance and improving the optical signal-to-noise ratio (OSNR)

Therefore, a chance for a particle to block an optical axis increases dramatically, and an error burst caused by optical axis blocking has become a serious problem. In addition, due to the dramatically increased vapor phase transportation materials, aged deterioration of optical transmission properties (increase of an optical loss) caused by adhering or scorching of the materials has also become noticeable. Moreover, due to the increase of light intensity, It becomes noticeably that even though a vapor phase transportation material does not approach an end of an optical waveguide, the material is laser trapped by only passing through the optical axis, so that the material is fixed on the optical axis or causes adhering or scorching on an end surface of a waveguide. A laser trap becomes particularly noticeable in a case where the power density of light is $1 \times 10^5$ W/cm$^2$ (@1.55 μm) or higher.

In addition, an LN crystal itself has a strong pyroelectric effect so that the crystal surface is strongly charged due to a temperature change. Therefore, a charged vapor phase transportation material is likely to be attracted to the surface of an LN crystal. In order to ensure the operational stability, a conductive film (a metal, a semiconductor, a resistor, or the like) such as an anti-charge film or a metal film is generally formed in a substrate of an LN optical modulator, except for a surface having an end portion of an optical waveguide (waveguide end portion surface) (for example, refer to Patent Literature 1, 2, and 3). On the other hand, an antireflection film is sometimes formed on the waveguide end portion surface. However, inmost cases, the waveguide end portion surface remains bare and no conductive film is formed on its surface. Therefore, charged particles and the like are likely to be attracted to the waveguide end portion surface. It is a serious problem particularly in a case of being used in an environment in which the temperature environment changes drastically (for example, a radio-on-fiber (RoF) system and a car network (NW)).

CITATION LIST

Patent Literature

[Patent Literature No. 1] Japanese Laid-open Patent Publication No. 62-173428
[Patent Literature No. 2] Japanese Laid-open Patent Publication No. 3-202810
[Patent Literature No. 3] Japanese Laid-open Patent Publication No. 2016-12037

SUMMARY OF INVENTION

Technical Problem

An object of the present invention is to provide an optical modulator module in which an occurrence of an error burst or an increase of an optical loss caused by a vapor phase transportation material can be effectively suppressed.

Solution to Problem

In order to achieve the object described above, an optical modulator module of the present invention has technical features as follows.

(1) There is provided an optical modulator module including a substrate that has a pyroelectric effect, an optical waveguide that is formed on a principal surface of the substrate, a conductive film that is formed on the substrate, and a control electrode that controls a light wave propagated through the optical waveguide. The light wave is input to an end portion of the optical waveguide or is output from the end portion of the optical waveguide by a space optical system. Adsorption means for adsorbing a vapor phase transportation material is disposed in the vicinity of the end portion of the optical waveguide.

(2) In the optical modulator module according to (1), the adsorption means is disposed on the principal surface of the substrate or a surface facing the principal surface in a case where the substrate is a Z-cut substrate, and is disposed on a side surface of the substrate in contact with the principal surface of the substrate in a case where the substrate is an X-cut substrate.

(3) In the optical modulator module according to (1) or (2), the adsorption means is a site in which no conductive film is formed.

(4) In the optical modulator module according to (1) or (2), the adsorption means is a reinforcing member fixed to the substrate.

(5) In the optical modulator module according to (4), a polarization direction of the reinforcing member and a polarization direction of the substrate are aligned with each other.

(6) In the optical modulator module according to (1) or (2), the adsorption means is disposed at a position separated from the substrate.

(7) In the optical modulator module according to (1) or (2), the adsorption means has an area of 1.4 mm$^2$ or greater.

(8) In the optical modulator module according to (1), the adsorption means is formed at a position other than a surface of the substrate having the end portion of the optical waveguide. The area of the adsorption means is equal to or greater than an area of the surface of the substrate having the end portion of the optical waveguide.

Advantageous Effects of Invention

The optical modulator module of the present invention includes the substrate that has a pyroelectric effect, the optical waveguide that is formed on the principal surface of the substrate, the conductive film that is formed on the substrate, and the control electrode that controls a light wave propagated through the optical waveguide. The light wave is input to the end portion of the optical waveguide by the space optical system. The adsorption means for adsorbing a vapor phase transportation material is disposed in a vicinity of the end portion of the optical waveguide. Therefore, an occurrence of an error burst or an increase of an optical loss caused by a vapor phase transportation material can be effectively suppressed.

DESCRIPTION OF EMBODIMENTS

Hereinafter, an optical modulator module according to the present invention will be described in detail.

Figure 1:
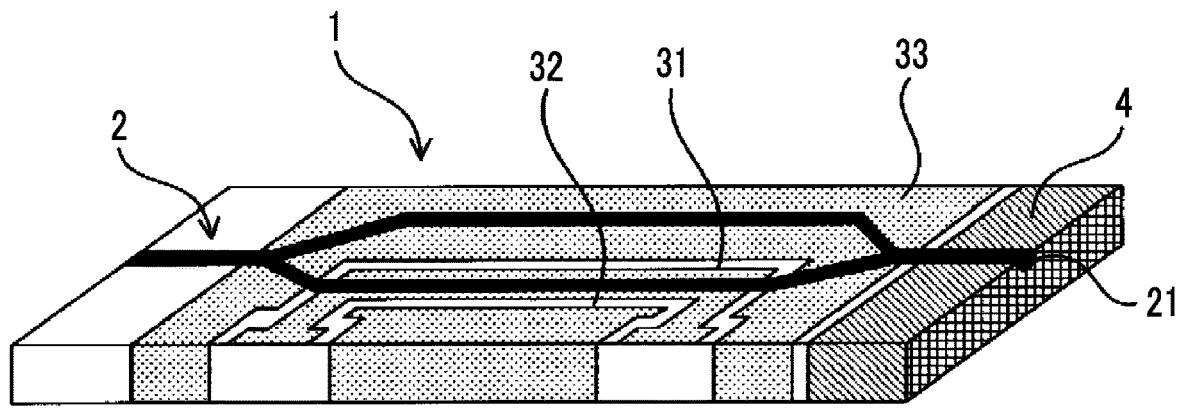
FIG. 1 is a perspective view illustrating Example of an optical modulator module according to the present invention.

As illustrated in FIG. 1, the optical modulator module according to the present invention includes a substrate 1 that has a pyroelectric effect, an optical waveguide 2 that is formed on a principal surface of the substrate 1, a conductive film (not illustrated) that is formed on the substrate 1, and control electrodes (31 to 33) that control a light wave propagated through the optical waveguide 2. In the optical modulator module, the light wave is input to an end portion 21 of the optical waveguide (or is output from the end portion 21 of the optical waveguide) by a space optical system (not illustrated). Adsorption means 4 for adsorbing a vapor phase transportation material is disposed in the vicinity of the end portion 21 of the optical waveguide.

FIG. 1 is a perspective view illustrating Example of an optical modulator module according to an aspect of the present invention.

As the substrate 1, any substrate may be employed as long as an optical waveguide can be formed in the substrate, such as quartz and a semiconductor. Particularly, it is possible to preferably utilize any single crystal of lithium niobate (LiNbO$_3$), lithium tantalate (LiTaO$_3$), and lead lanthanum zirconate titanate (PLZT), which is a substrate having an electro-optic effect.

For example, the optical waveguide 2 to be formed in the substrate 1 is formed by thermally diffusing a high refractive index substance such as titanium (Ti) on a LiNbO$_3$ substrate (LN substrate). In addition, it is also possible to utilize a rib optical waveguide in which grooves are formed on both sides of a part which will serve as an optical waveguide, or a ridge waveguide having a convex optical waveguide part. In addition, the present invention can also be applied to an optical circuit in which optical waveguides are respectively formed in waveguide substrates made of materials different from each other and these waveguide substrates are affixed and integrated together.

The substrate 1 is provided with control electrodes for controlling a light wave propagated through the optical waveguide 2. The control electrodes include signal electrodes 31 constituting modulation electrodes, and ground electrodes 32 and 33 surrounding the signal electrodes 31. A DC bias electrode applying a DC bias can also be provided. These control electrodes can be formed by forming electrode patterns of Ti and Au on a substrate surface and performing laminating by a plating method or the like. Moreover, as necessary, a buffer layer such as a dielectric substance (SiO$_2$) can be provided on the substrate surface after the optical waveguide is formed.

Since a material having a pyroelectric effect is used for the substrate 1, a conductive film for alleviating the pyroelectric effect is provided on the substrate surface or the buffer layer surface, and the control electrodes are formed on the substrate surface or the buffer layer surface. In addition, as in Patent Literature 1 or Patent Literature 2, in the conductive film, a conductive film may also be formed not only on the principal surface of the substrate 1 (electrode forming surface) but also on a back surface or a side surface of the substrate 1. However, no conductive film is formed on a surface having the end portion 21 of the optical waveguide (waveguide end portion surface). An anti-charge film such as a Si film, or a metal film can be used as the conductive film.

Here, the optical modulator module according to the aspect of the present invention has a structure in which a light wave is input to the end portion 21 of the optical waveguide by the space optical system (not illustrated), and adsorption means 4 for adsorbing a vapor phase transportation material is provided at a position other than the waveguide end portion surface, in the vicinity of the end portion 21 of the optical waveguide. In the example of FIG. 1, the adsorption means 4 is disposed on a surface (the principal surface or the side surface) other than the waveguide end portion surface of the substrate 1. As the adsorption means 4, a configuration using a substrate portion in which no conductive film is formed may be adopted, or a configuration in which the substrate portion is coated with a dielectric film (insulating film) may be adopted.

When such adsorption means 4 is provided in the vicinity of the end portion 21 of the optical waveguide, a vapor phase transportation material is captured by the adsorption means 4 and is adsorbed in the adsorption means 4, so that a vapor phase transportation material near the end portion 21 of the optical waveguide can be reduced. Therefore, an occurrence of an error burst due to optical axis blocking of a vapor phase transportation material, or an increase of an optical loss due to adhering or scorching of a vapor phase transportation material to the end surface of the optical waveguide can be effectively suppressed. An effective distance of the adsorption means 4 from the end portion 21 of the optical waveguide is 1 mm or shorter, and a vapor phase transportation material can be more efficiently adsorbed if the distance is 0.7 mm or shorter, which is more effective in an integrated modulator such as DP-QPSK modulators which are significantly affected by a vapor phase transportation material. In addition, as an opinion of the inventors, it is effective to have the area of the adsorption means 4 to be equal to or greater than the area of the end surface of the optical waveguide.

In a configuration using a substrate portion in which no conductive film is formed as the adsorption means 4, the adsorption means 4 may be disposed on at least the principal surface of the substrate or the back surface (the principal surface a surface facing) of the substrate in a case where the substrate is a Z-cut substrate, and may be disposed on at least the side surface of the substrate in contact with the principal surface of the substrate in a case where the substrate is an X-cut substrate.

Figure 2:
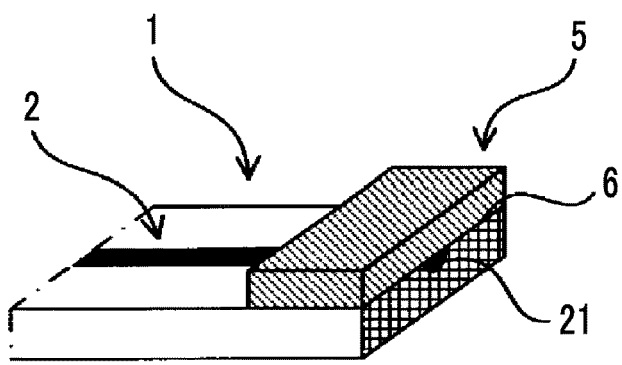
FIG. 2 is a perspective view illustrating another Example of the optical modulator module according to the present invention.

In addition, in place of the configuration in which the adsorption means 4 is provided in the substrate 1 itself as in FIG. 1, a reinforcing member 5 may be used as adsorption means by being bonded and fixed at a position other than the waveguide end portion surface in the vicinity of the end portion 21 of the optical waveguide, as in FIG. 2. Similar to the substrate 1, a material having a pyroelectric effect, such as $LiNbO_3$, $LiTaO_3$, or PLZT, can be used as the reinforcing member 5. In this case, the reinforcing member 5 is required to have a surface in which no conductive film is formed.

In FIG. 2, a small piece of LN crystal which is an example of the reinforcing member 5 is provided on the principal surface of the substrate 1. Alternatively, the reinforcing member 5 may be provided on the side surface or the back surface of the substrate 1. When the reinforcing member 5 is fixed to the substrate 1, its polarization direction (principal axes (c-axis and Z-axis) of ferroelectric polarization) is aligned with the polarization direction of the substrate 1, so that the difference in thermal expansion between the substrates caused by a temperature change can be alleviated without eliminating generated pyroelectricity.

Figure 3:
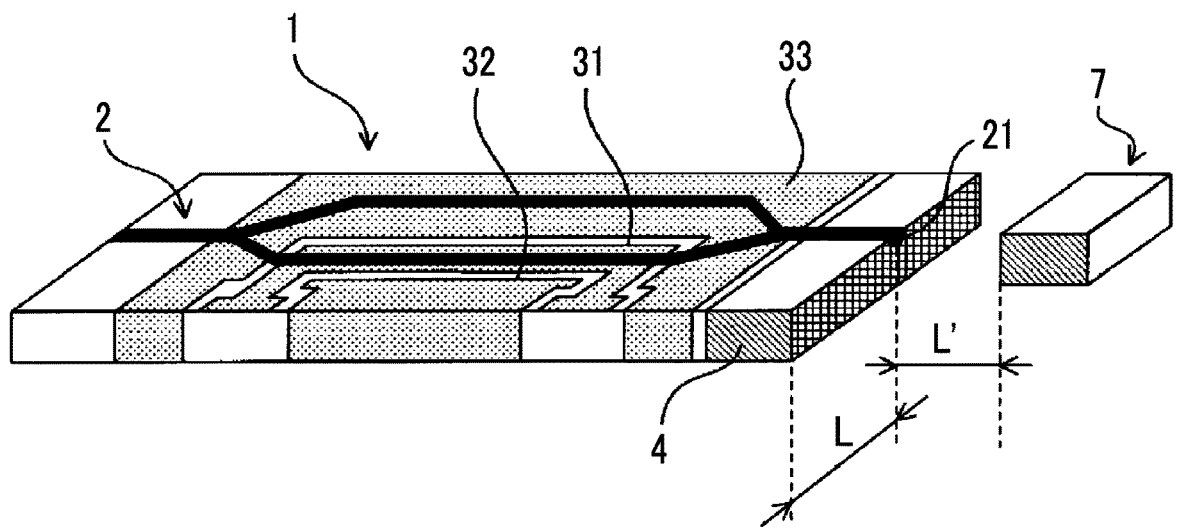
FIG. 3 is a perspective view describing a distance between an end of an optical waveguide and a member having a pyroelectric effect.

In addition, if a member having a pyroelectric effect, such as a small piece of LN crystal, is disposed at a position separated from the substrate 1, instead of fixing to the substrate 1 as the reinforcing member 5 as in FIG. 2, it is possible to achieve an effect of reducing a vapor phase transportation material near the end portion 21 of the optical waveguide. Here, for example, as illustrated in FIG. 3, it is assumed that the adsorption means 4 is provided on the side surface of the substrate 1 and a member having a pyroelectric effect is disposed as adsorption means 7 at a position separated from the substrate 1. In this case, when the distance between the end portion 21 of the optical waveguide and the adsorption means 4 on the side surface of the substrate 1 is L and the distance between the end portion 21 of the waveguide and the adsorption means 7 is L', a higher effect can be achieved by disposing the members with a relationship of L>L'.

In addition, in order to firmly fixing a vapor phase transportation material, a member having an adsorption effect, such as modified silicone or an adhesive elastomer, may be partially disposed on a surface of the reinforcing member 5. According to such a configuration, the adsorption effect of the reinforcing member 5 and the adsorption effect of modified silicone, an adhesive elastomer, or the like function synergistically. Therefore, a vapor phase transportation material can be firmly fixed.

As described above, a vapor phase transportation material near the end portion 21 of the optical waveguide can be reduced by providing adsorption means of various forms in the vicinity of the end portion 21 of the optical waveguide. However, the adsorption means may have an area of 1.4 $mm^2$ or greater. Here, the area of the adsorption means indicates its total area. That is, in a case where there are a plurality of units of adsorption means or in a case where adsorption means includes a plurality of surfaces having an adsorption effect, the total area of the surfaces become the area of the adsorption means. Generally, no conductive film is formed on a surface of the substrate 1 having the end surface of the optical waveguide (waveguide end portion surface), which thereby having a slight adsorption effect. However, in the present invention, the area of the waveguide end portion surface is not included in the area of the adsorption means. In addition, a Z-cut substrate has a smaller adsorption effect on the waveguide end portion surface than an X-cut substrate. Therefore, a higher adsorption effect can be achieved when the adsorption means is provided in a Z-cut substrate.

Hereinabove, the present invention has been described based on the example. The present invention is not limited to the contents described above, and it is needless to mention that the design can be suitably changed within a scope not departing from the gist of the present invention.

In this description, a configuration in which a light wave is input to the end portion of the optical waveguide has been described. However, the present invention can also be applied to a configuration in which a light wave is output from the end portion of the optical waveguide, in a similar manner. In the input end portion and the output end portion of the optical waveguide for a light wave, since the input end portion has greater power density of light, the input end portion has a significant laser trapping effect. Therefore, it is more effective to apply the present invention to the input end portion of the optical waveguide.

INDUSTRIAL APPLICABILITY

As described hereinabove, according to the present invention, it is possible to provide an optical modulator module in which an occurrence of an error burst or an increase of an optical loss caused by a vapor phase transportation material can be effectively suppressed.

REFERENCE SIGNS LIST

1: substrate
2: optical waveguide
4, 5, 7: adsorption means
6: non-conductive adhesive
21: end portion of optical waveguide
31: signal electrode
32: ground electrode

The invention claimed is:

1. An optical modulator module comprising:
a substrate that has a pyroelectric effect;
an optical waveguide that is formed on a principal surface of the substrate;
a conductive film that is formed on the substrate; and
a control electrode formed on the conductive film that controls a light wave propagated through the optical waveguide, wherein the light wave is input to an end portion of the optical waveguide or is output from the end portion of the optical waveguide by a space optical system, and
an adsorber configured to adsorb a vapor phase transportation material is disposed in a vicinity of the end portion of the optical waveguide.

2. The optical modulator module according to claim 1, wherein the adsorber is disposed on the principal surface of the substrate or a surface facing the principal surface in a case where the substrate is a Z-cut substrate, and is disposed on a side surface of the substrate in contact with the principal surface of the substrate in a case where the substrate is an X-cut substrate.

3. The optical modulator module according to claim 1, wherein the adsorber is a site in which no conductive film is formed.

4. The optical modulator module according to claim 1, wherein the adsorber is a reinforcing member fixed to the substrate.

5. The optical modulator module according to claim 4, wherein a polarization direction of the reinforcing member and a polarization direction of the substrate are aligned with each other.

6. The optical modulator module according to claim 1, wherein the adsorber is disposed at a position separated from the substrate.

7. The optical modulator module according to claim 1, wherein the adsorber has an area of 1.4 $mm^2$ or greater.

8. The optical modulator module according to claim 1, wherein the adsorber is formed at a position other than a surface of the substrate having the end portion of the optical waveguide, and wherein the area of the adsorber is equal to or greater than an area of the surface of the substrate having the end portion of the optical waveguide.

* * * * *